(No Model.)

I. R. BLUMENBERG, Dec'd.

W. BLUMENBERG, Administratrix.

VAPOR ENGINE PACKING AND LUBRICATING DEVICE.

No. 290,965. Patented Dec. 25, 1883.

Attest:

J. Walter Fowler,

Henry Glassie

Inventor;

Israel R. Blumenberg

By D. A. Glassie

His Attorney.

N. PETERS. Photo-Lithographer, Washington, D. C.

UNITED STATES PATENT OFFICE.

ISRAEL R. BLUMENBERG, OF WASHINGTON, DISTRICT OF COLUMBIA; WILHELMINA BLUMENBERG, ADMINISTRATRIX OF SAID BLUMENBERG, DECEASED, ASSIGNOR TO FRANCIS H. SMITH, OF SAME PLACE.

VAPOR-ENGINE PACKING AND LUBRICATING DEVICE.

SPECIFICATION forming part of Letters Patent No. 290,965, dated December 25, 1883.

Application filed February 3, 1883. (No model.)

*To all whom it may concern:*

Be it known that I, ISRAEL R. BLUMENBERG, a citizen of the United States, residing at Washington, in the District of Columbia, have invented certain new and useful Improvements in Vapor-Engine-Cylinder Packing and Lubricating Devices, of which the following is a specification, reference being had therein to the accompanying drawings.

My invention relates to a new and useful improvement in the method of confining and utilizing volatile fluids in motor-engines, as well as in improvements in the form, construction, and arrangement of the interior of the cylinder-piston packing-box.

In motor-engines where the impelling-power is a dry subtle vapor of great expansive power, liable to escape, experience has demonstrated that the lubricator employed must, in addition to causing the parts to move smoothly, act as a complete barrier and seal to the escape of the vapor.

With a view to meeting these requirements my invention consists in constructing a lubricating-reservoir wholly within the packing-box of the engine-cylinder, at a point and in such a position that the reciprocating rod of the piston, in passing to and fro, will pass through and be surmounted by a body of liquid packing, consisting of glycerine or other suitable lubricator, which, in addition to freely lubricating both the piston and reciprocating rod, will hermetically seal up the avenues of escape for the vapor.

It also consists in constructing in the wall, at the outer end of the packing-box, an automatic lubricating drip-fountain, for lubricating the reciprocating rod and keeping it free.

Figure 1:
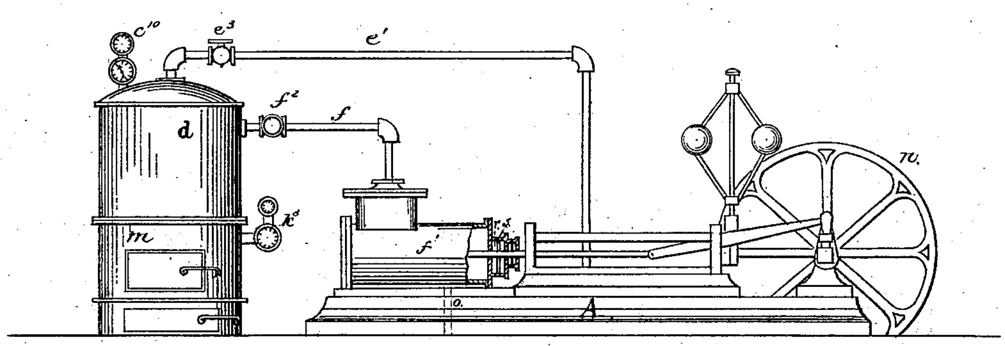
Figure 2:
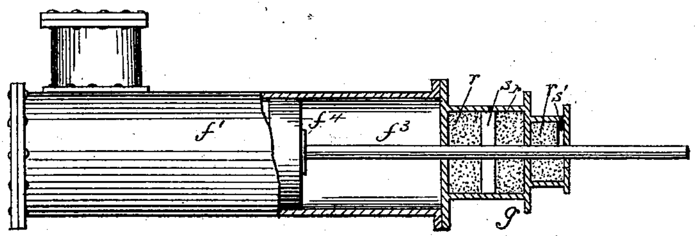
Figure 3:
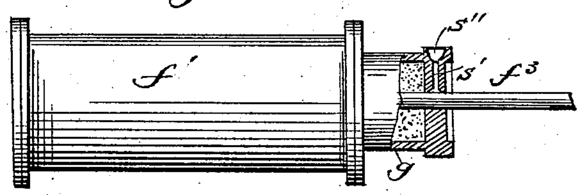

Figure 1 is a side elevation of a furnace and vapor-generator and an engine, the cylinder whereof is broken away to show the lubricating-reservoir, wholly within the packing-box, and the fountain-drip channel. Fig. 2 is an enlarged side elevation of the engine-cylinder, showing the lubricating-reservoir and fountain drip-channel, piston, and reciprocating rod. Fig. 3 is an enlarged view of the lubricating drip and channel in the head of the cylinder packing-box.

Similar letters of reference indicate corresponding parts.

A is a motor-engine, of which $f'$ is the cylinder, $f^4$ the piston, $f^3$ the reciprocating rod, $g$ the packing-box, $r$ the packing, $s$ the lubricator-reservoir wholly within the packing-box, $s'$ the automatic lubricator drip-fountain, $f$ the vapor-induction pipe, and $o$ the exhaust-pipe.

Into and forming part of the packing-box $g$, or merely adjusted and secured therein, as is most convenient, in the midst of the packing $r$, are two disks, bored through the center to permit the free passage of the reciprocating rod $f$, which disks form the walls of an annular space or chamber, $s$, the entire circumference of and wholly within the chamber, near the interior wall of the packing-box $g$, for receiving and retaining a quantity of glycerine or other suitable lubricator, which chamber $s$, I call a "lubricator-reservoir," and the whole is so arranged that when the stuffing-box has been properly packed and the reservoir $s$ has been filled with glycerine or other lubricator, the lubricator will wholly surround the reciprocating rod $f^3$, which, in moving backward and forward, will automatically keep the interior end of the reciprocating rod and piston fully lubricated and the channel hermetically sealed up—that is to say, the reservoir is preferably arranged nearer to the interior end of the packing-box than to the exterior end, so that by the passage of the reciprocating rod $f^3$ a certain quantity of the lubricator will be carried into the cylinder proper, by which the piston is lubricated, causing the parts thereof to move smoothly.

In the outer head of the packing-box $g$, I construct a small lubricator-cup, $s'$, communicating by a slight channel, $s^2$, with the channel for the passage of the reciprocating rod $f^3$, where it terminates in a slightly-flaring outlet, through which a sufficient quantity of suitable lubricant is permitted to drip onto the reciprocating rod, which, being carried inward toward, feeds and co-operates with the fluid-packing chamber $s$, and lubricates and seals up the remainder of the channel, and at the same time automatically lubricates the outer wall.

$d$ is a vertical vapor-generator, adjusted over a furnace, $m$. This generator is connected by the vapor-eduction pipe $f$, provided with a valve, $f^2$, with the cylinder $f'$ of the engine A. The engine A is, by an exhaust-pipe, $o$, connected with a condenser, and that with a reservoir, (the two last not shown,) and the reservoir by a pump, and the pipe $c'$, is connected with the vapor-generator $d$. Volatile fluid, as it is required, is automatically pumped through the pipe $c$ into the vapor-generator $d$, where, by a moist heat generated by steam, it is instantly converted into power-vapor, and through the pipe $f$ carried to the cylinder $f'$ of the engine A, where, by the construction and arrangement of my lubricator-reservoir and packing, hereinbefore described, no part of it is permitted to escape, except through the exhaust-pipe $o$ into the condenser, where it is again resolved into liquid, returned to the reservoir, and again used.

Having now fully described my device, what I esteem as novel, and desire to protect by Letters Patent, is—

1. In a power-vapor motor-engine cylinder, the combination of a lubricant packing reservoir or chamber, $s$, constructed wholly within the interior of the packing-box $g$, in the midst of the packing $r$, nearer to the interior than the outer wall, co-operating lubricating drip-channel $s^2$ in the outer wall, reciprocating piston-rod $f^3$, piston $f^1$, power-vapor-induction pipe $f$, and exhaust-pipe $o$, substantially as and for the purpose indicated.

2. In combination, power-vapor motor-engine cylinder $f$, piston $f^1$, reciprocating rod $f^3$, fluid-packing reservoir $s$ in the midst of the packing $r$, nearer to the interior than the exterior wall of the packing-box $g$, and constructed wholly within the chamber and co-operating with and fed from a lubricating drip-channel, $s^2$, substantially as shown, and for the purpose described.

In testimony whereof I hereunto affix my signature in presence of two witnesses.

ISRAEL R. BLUMENBERG.

Witnesses:

A. P. RUTHERFORD,

HENRY POLSZ.